May 22, 1923.
J. I. BERG
PATCH FOR PNEUMATIC TIRES
Filed June 13, 1922
1,456,115
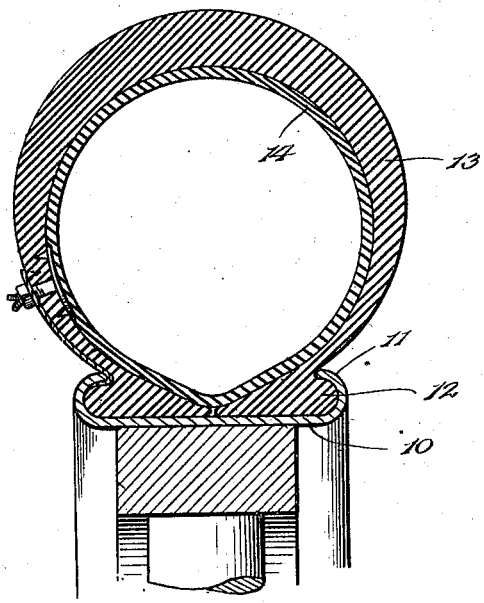
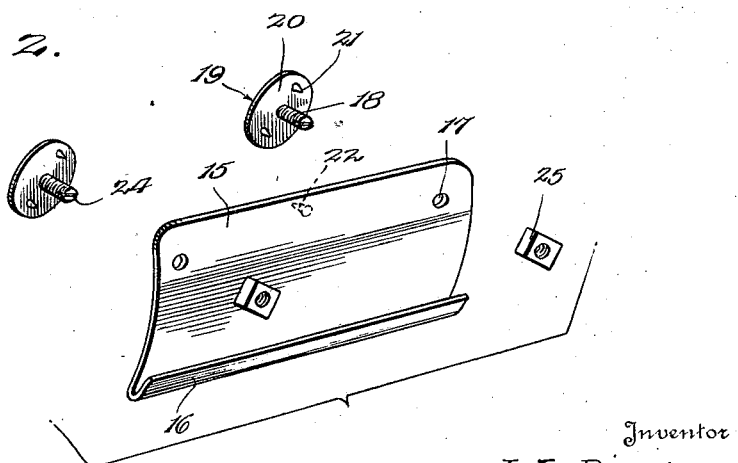
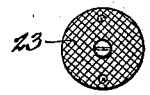
Inventor
J. I. Berg.
By Lacey & Lacey, Attorneys Patented May 22, 1923.

1,456,115

UNITED STATES PATENT OFFICE.

JULIUS I. BERG, OF BERG, NORTH DAKOTA.

PATCH FOR PNEUMATIC TIRES.

Application filed June 13, 1922. Serial No. 568,025.

*To all whom it may concern:*

Be it known that I, JULIUS I. BERG, a citizen of the United States, residing at Berg, in the county of McKenzie and State of North Dakota, have invented certain new and useful Improvements in Patches for Pneumatic Tires, of which the following is a specification.

My invention relates to pneumatic tires and has for its main object to provide a patch that may readily and quickly be attached over slits and cuts in a tire casing and to give ample strength to the injured portion of the casing.

Another object of the invention is to so construct the device that it may be attached without demounting the tire but after deflating the same. When once in position, the patch will hold on the more firmly, the harder the tire becomes through inflation.

In the accompanying drawing:

Figure 1 shows a radial section of a wheel tire with my improved patch secured thereon, Figure 2 is a perspective view of the details of the device, and Figure 3 is an end elevation of one of the details.

The reference numeral 10 represents the rim of a pneumatic tire wheel provided with inwardly bent flanges 11 adapted to engage with the beads 12 of the cushion 13, which encloses the pneumatic tube 14 in the usual manner.

The device consists of a metallic plate 15, the curvature of which conforms with the contour of the outer face of the cushion 13. Along the lower edge of the plate is an upwardly bent lip 16 adapted to engage under the flange 11 of the wheel rim 10. Near the upper edge of the plate 15 are provided apertures 17 for the threaded shanks 18 of the screws 19. These screws are provided with large flat heads 20, which may be round or oval in shape, and have two or more prongs 21 on their undersides. These prongs 21, as well as one or more similar prongs 22 provided on the inner side of the plate 15, are intended to be embedded in the fabric of the casing 13 when the parts are assembled.

Between the heads 20 and the inner side of the casing 13, I preferably insert a rubber gasket 23 to prevent the wearing of the inside of the casing 13 when the screws are tightened. The ends of the screw shanks 18 are scored or slit, as at 24, for the purpose of firmly holding the nuts 25 in place after they have been drawn up on the shanks.

The device is assembled on the tire in the following manner: When the casing 13 has been injured, the first operation is to deflate the tire in order to collapse the inner tube 14 and the casing 13. A suitable plate 15 for covering the slit or rent in the casing is then laid over the same and the position of the apertures 17 marked off on the outside of the casing 13 and corresponding holes pierced therein. The screws 19 with the gasket 23 assembled thereon are now inserted through the rent in the casing 13, and the shanks 18 pressed from the inside out through the holes just made therein so that the ends of the shanks project beyond the outside of the casing. The plate 15 is then laid over the rent or slit in the casing and the lip 16 pushed under the flange 11 in the rim 10. The nuts 25 are thereupon threaded on their respective screw shanks and drawn up tightly so that the prongs 21 and 22 are sure to be embedded in the casing. By now inserting a screw driver or any other edged tool in the scores 24 of the screw shanks 18, the ends of the shanks may be spread apart to insure against the unscrewing of the nuts 25. Lastly, the tire is inflated and the harder it becomes, the better grip will the patch have on the casing.

The patches are preferably made in different sizes according to the length of the slits in the casing, as, for instance, two inches by three inches, two and one-half inches square or any other suitable size.

The screw heads 20 must have smooth inner and outer surfaces and no sharp edges and I may provide a smooth rubber lining over the heads in order not to wear or tear the inner tube when the parts are assembled.

Having thus described the invention, what is claimed as new is:

1. A detachable patch for wheel casings comprising a plate curved in conformity with the contour of the outer surface of the casing and provided with a lip along its entire length adapted to grip the wheel rim, a pair of flat-headed screws with scored ends, rubber gaskets between said heads and the inner surface of the casing, and nuts for drawing said plate and screws firmly together squeezing the casing between them, apertures being provided for the screws in said plate.

2. A detachable patch for wheel casings comprising a plate curved in conformity with the contour of the outer surface of the casing and provided with a lip along its entire length adapted to grip the wheel rim, a pair of flat-headed screws with scored ends, rubber gaskets between said heads and the inner surface of the casing, and nuts for drawing said plate and screws firmly together squeezing the casing between them, apertures being provided for the screws in said plate, said plate and screw heads having opposing prongs adapted to enter the fabric of the casing.

In testimony whereof I affix my signature.

JULIUS I. BERG. [L. S.]